H. L. DOHERTY.
PROCESS OF MANUFACTURING OXYGEN.
APPLICATION FILED MAY 15, 1911.
1,048,812.
Patented Dec. 31, 1912.
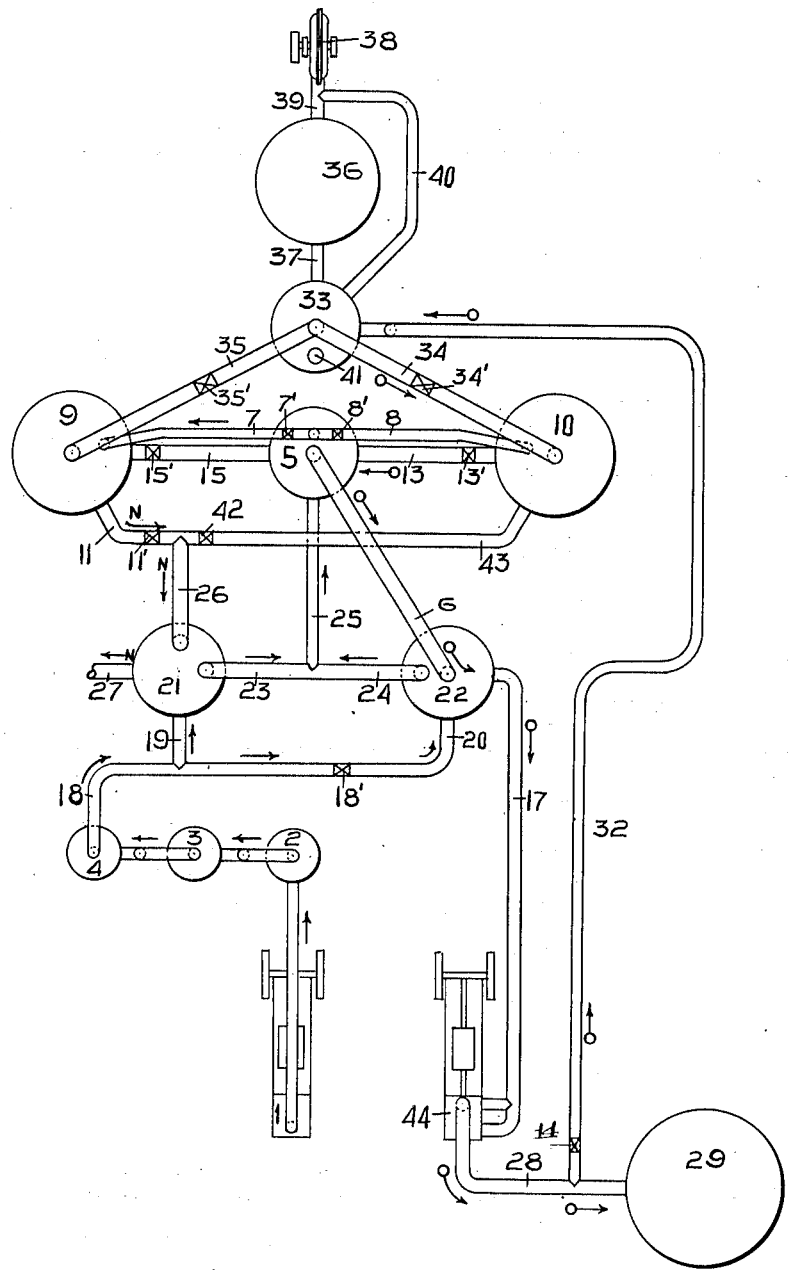
Witnesses:
Frank L. Blackburn
N B Siverson
Henry L. Doherty Inventor
By his Attorney Frank S Young Add commentary

UNITED STATES PATENT OFFICE.

HENRY L. DOHERTY, OF NEW YORK, N. Y.

PROCESS OF MANUFACTURING OXYGEN.

1,048,812.  Specification of Letters Patent.  Patented Dec. 31, 1912.

Application filed May 15, 1911. Serial No. 627,131.

*To all whom it may concern:*

Be it known that I, HENRY L. DOHERTY, a citizen of the United States, and a resident of New York city, in the county of New York and State of New York, have invented certain new and useful Improvements in Processes of Manufacturing Oxygen, of which the following is a specification.

This invention relates to processes of manufacturing oxygen and, in particular, to that class of such processes in which the oxygen is produced by alternately forming barium peroxid by oxidizing barium oxid by atmospheric air and decomposing the peroxid to liberate the extra atom of oxygen held by the molecule of peroxid.

The object of this invention is to improve present methods of oxygen manufacture in such a way as to diminish the expenditure of fuel on the one hand and to increase the volume of oxygen produced in a given time from a given weight of barium peroxid on the other.

To this end my invention consists, briefly stated, in carrying out the operations of peroxidizing and deoxidizing the barium oxid on comparatively large masses of the material contained in suitable towers having a thick non-conducting lining, the proper temperature of the oxid being maintained by by-passing a part of the oxygen drawn off during the de-oxidizing operation back to the oxid towers through a superheater in which it is highly superheated, as well as other features which will be more fully described later.

In the accompanying drawings I have illustrated diagrammatically an arrangement of apparatus suitable for carrying out my invention. In this I have indicated the course of the gaseous currents during one phase of the operation, the air current being indicated by →, the oxygen current by O→, and the waste air current by N→.

The method of operation is as follows: The air which is to be used in peroxidizing the barium oxid is forced by the blowing engine 1 to the first purifying tower 2. This is filled with some material capable of absorbing water and carbonic acid such as lime (CaO), or a mixture of lime and calcium chlorid. In this tower the major parts of the moisture and carbonic acid are absorbed and the air next passes to other purifying apparatus where the last traces of water and carbonic acid are removed. I prefer to use anhydrous sulfuric acid and caustic soda or potash for the final purification but any other satisfactory method may be substituted. The anhydrous sulfuric acid is contained in chamber 3, while the caustic alkali is contained in chamber 4. The anhydrous sulfuric acid removes the final traces of the moisture of the air while the caustic soda removes the final traces of the carbonic acid and any acid vapors carried over from the sulfuric acid vessel 3. From 4 the air, now substantially free from moisture and carbonic acid, passes to the heat interchangers 21, 22 and 5 through the pipe 18 and connections 19 and 20, shown. A valve, 18', on 18 serves to regulate the distribution of air between 21 and 22. In 21 and 22 the air is subjected to a preliminary heating to approximately 1000° F. by the sensible heat of the nitrogen residue from the peroxidizing operation and of the partially cooled oxygen from the heater 5. The heat interchangers 21, 22 and 5 may be of any suitable construction of the double-surface recuperator type. From 21 and 22 the partially heated air passes through the connections 23, 24 and 25 to the final heat interchanger 5. In 5, which, like 21 and 22, may be of any suitable surface recuperator construction, the entering air is further heated by the sensible heat of the oxygen which is, at the same time, being drawn off from an oxid vessel which is undergoing de-oxidation. The air should leave the chamber 5 at a temperature approximating 1200° F. and should not be below 1100° F. With the air at this temperature the heat developed in the peroxidizing of the barium oxid is sufficient to maintain the oxid at the proper temperature. From 5 the heated and purified air passes through the pipes 7 or 8 to one of the barium oxid towers 9 or 10. Valves 7' and 8' on 7 and 8 respectively serve to control the flow of the air. With the setting of the valves assumed in the diagram the direction of flow of the currents is shown by the arrows. The valve 7' being open and 8' closed, the air flows through 7 to the bottom of tower 9, passes up through 9 in contact with the barium oxid with which 9 is filled, the nitrogen and any unabsorbed oxygen discharging through the pipe 11, which is provided with a valve 11', and pipe 26 to the heat interchanger 21, after passing through which it discharges through the pipe 27. The oxid in the tower 9 is maintained at a temperature of about 1200° F. in the manner described later. At this temperature the barium oxid takes up an additional atom of oxygen to form peroxid according to the reaction,

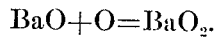

In carrying out this method of oxygen manufacture it is not found practicable to convert the whole of the BaO to BaO$_2$ owing to the difficulty and slowness of carrying the reaction to completion. Therefore, I continue the peroxidizing operation only so long as the absorption of the oxygen proceeds readily and the escaping gas from 11 contains very little oxygen. The exact time required for this operation depends mainly upon the temperature and the rate at which air is supplied to 9. With a properly designed plant, the duration of each peroxidizing operation will be from five to fifteen minutes. The precise manner of handling the peroxidizing operation may, however, be varied within wide limits, and I therefore do not limit myself to the specific details of the same outlined.

While the material in 9 has been undergoing peroxidation in the manner outlined, the charge of BaO$_2$ in 10 has been undergoing de-oxidation and heating in the manner described below.

The charge in 10, having been previously subjected to peroxidation, consists in part of barium peroxid (BaO$_2$). The peroxidized barium is chiefly on the outer shell of the fragments of BaO. During the de-oxidation the tower 10 is connected through the pipe 13, oxygen passages of heater 5, pipe 6, oxygen passages of heat interchanger 22 and pipe 17 with the exhauster 44, which is operated to produce a high vacuum in 10. Under this vacuum the BaO$_2$ previously formed in 10 gives off the extra atom of oxygen thus,

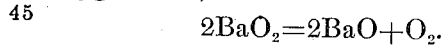

The temperature in 10 being maintained at a relatively high point (about 1300°) in the manner described below, the liberated oxygen enters the heater 5 at about this temperature. The air entering 5 at a temperature of about 1000° or below takes up additional heat from the oxygen and thereby has its temperature considerably increased. The oxygen leaves 5 at about 1000° and passes through 6 to the heat interchanger 22. Here it is still further cooled by a portion of the air which is regulated in volume by the valve 18′. Leaving 22 at a temperature of about 100° or so the oxygen may be passed directly to the exhauster 44 or passed through a condenser where it may be cooled by water to increase the capacity of the exhauster. From 44 exhauster the oxygen passes through the pipe 28 to the storage tank or gas holder 29. From 28, or from 29 if preferred, a portion of the oxygen is drawn off through the pipe 32 to the superheater 33. Here it is highly heated (to from 1800 to 2000° F.) and passes thence to one of the oxid towers 9 or 10. As indicated in the diagram the hot oxygen from 33 is passing through the pipe 34 to tower 10. Here it parts with its superheat to the oxid in 10, which is being cooled by the deoxidizing reaction mentioned, and by the unavoidable loss of heat in the oxygen drawn off, as well as by a small loss of heat to the atmosphere by radiation and conduction from the wall of the chamber. This last loss may be reduced to a minimum by making the walls double so as to leave an air space and then connecting this space with the pipe leading to the exhauster, as well as by jacketing the outer wall. The superheater 33 is preferably heated by producer gas generated in a gas producer, 36, and conducted to 33 by the conduit 37. Air is supplied to producer 36 by the blower 38 through pipe 39. A branch, 40, of 39 diverts the larger portion of the air to the superheater 33 to burn the producer gas. If preferred, the combustion in 33 may be conducted under natural draft instead of forced draft. The products of the combustion escape through the stack 41. The by-passed oxygen of course mingles with the oxygen given off from the barium oxid and again passes through the system to the holder 29.

When the gas discharging from 9 shows a considerable percentage of oxygen, indicating that the oxidizing reaction in 9 is diminishing in velocity and that a considerable quantity of oxygen is escaping absorption by the oxid, the valves are shifted so that the air flows to the chamber 10 while the exhauster 44 draws from the chamber 9. To accomplish this in the apparatus diagrammed valves 7′, 11′, 13′ and 34′ are closed and 8′, 15′, 35′ and 42 opened. Air is now passing through 8 to 10, where its oxygen is abstracted, the residual nitrogen passing through 43, 26, 21 and 27 to the atmosphere or to storage when utilized. Chamber 9 is connected in its turn to the exhauster 44 through 15, 5, 6, 22 and 17. Oxygen is by-passing back from 28 through 32, 33 and 35 to 9.

When the valves are changed the air valves are first shifted, the tower 10 being preferably left on the exhauster until the entering air has displaced practically all the oxygen left in the chamber. Owing to the high comparatively vacuum maintained in 10 during deoxidation, however, the quantity of free oxygen in 10 at any time is not very large and the displacement of it before shifting the valves on the oxygen lines may be dispensed with if preferred. When a sufficient time has elapsed for the displacement of the oxygen (which interval is determined by experiment on starting operations) the oxygen valves are shifted so that the exhauster draws from 9.

In distributing the air between 21 and 22 care should be taken to see that it is distributed in about the same relative proportion as the two gases nitrogen and oxygen occur in the atmosphere. In this way, in connection with the use of the oxygen alone in 5 to impart a final heating to the air, I secure a perfectly balanced heat transfer in the heat interchangers, since the heat capacities of the two currents are approximately equalized.

In the present used methods of making oxygen from barium oxid (commonly known as Brin's process) the oxid is heated in small retorts by an external flame. Since barium oxid is a fairly good non-conductor of heat this method of heating is far from efficient. Besides, radiation losses are heavy owing to the comparatively large extent of surface of the containers relative to the quantity of BaO. The heating of the barium oxid is far from uniform, the temperature of the oxid lying next to the wall of the retorts being considerably higher than the interior of the charge.

By my improved method of carrying out the operation, I make it possible, 1st, to secure a practically perfect heat recuperation; 2nd, by internal heating of the charge, I reduce the heat losses from the barium chambers to a negligible quantity by making it possible to use practically perfect heat insulating devices on the exterior surfaces of the shells of the chambers and to operate upon large masses of the BaO at one time whereby the rate of yield of the oxygen is greatly increased.

It is to be understood that I do not limit myself in any way in regard to the temperatures and pressures employed in the BaO towers. I may state, however, that I find it advantageous during oxidation of the BaO to finish up the operation at a pressure of about 25 lbs. per sq. in. absolute and during deoxidation to finish up the operation at approximately 2 lbs. absolute.

It is also to be understood, that I do not limit myself to the use of my process in connection with the manufacture of oxygen specifically, but that I claim it in connection with any similar gas producing process.

Having described my invention, what I claim is:—

1. In the manufacture of oxygen from a peroxid the method of heating the peroxid which comprises re-heating a portion of the oxygen evolved from the said peroxid and contacting the said re-heated oxygen with the said peroxid.

2. In the manufacture of oxygen from a peroxid the method of heating the peroxid which comprises re-heating a portion of the oxygen evolved from the said peroxid and contacting the said re-heated oxygen with the said peroxid, the volume of the re-heated oxygen relative to the total volume of the oxygen evolved being such as will carry sufficient heat above the temperature at which it is desired to maintain the peroxid to approximately balance the loss of heat from the said peroxid due to the evolution of its oxygen.

3. In the manufacture of oxygen from a peroxid the method of heating the peroxid which comprises re-heating a portion of the oxygen evolved from the said peroxid and contacting the said re-heated oxygen with the said peroxid, the temperature to which the re-heated oxygen is raised being such as will impart to the said re-heated oxygen a quantity of available heat sufficient to approximately balance the loss of heat from the said peroxid due to evolution of its oxygen.

4. In the manufacture of oxygen from a peroxid, the method of heating the peroxid which comprises re-heating a portion of the oxygen evolved from the said peroxid and contacting the said re-heated oxygen with the said peroxid, the volume of the re-heated oxygen relative to the volume of the oxygen evolved from said peroxid, and the temperature to which the said re-heated oxygen is raised, being such as will impart to the said re-heated oxygen a quantity of available heat sufficient to approximately balance the loss of heat from the said peroxid, due to evolution of its oxygen.

5. In the manufacture of oxygen from a peroxidized metallic oxid, the method of heating the said oxid which comprises the continuous withdrawal of a portion of the evolved oxygen, the re-heating of the said portion of oxygen, and the continuous by-passing of said re-heated portion back to the said metallic oxid.

6. In the manufacture of oxygen from a peroxidized metallic oxid, the method of heating the said oxid which comprises the continuous withdrawal of a portion of the evolved oxygen, the re-heating of the said portion of oxygen, the continuous by-passing of the said re-heated portion of oxygen back to the said metallic oxid, and the passing of the said portion in contact with the said oxid, whereby the available heat of the said re-heated portion is transferred to said oxid, the volume of the portion of oxygen so withdrawn and the temperature to which it is re-heated being so regulated that the available heat imparted to the said re-heated portion of oxygen will approximately balance the loss of heat from the said oxid due to evolution of oxygen from the same.

7. In the manufacture of oxygen from peroxidized barium oxid, the method of heating the said barium oxid, which comprises the continuous withdrawal of a portion of the oxygen evolved from said peroxidized barium oxid during the partial deoxidation of the same, the re-heating of the said portion of oxygen, and the continuous by-passing of said re-heated portion back into contact with the peroxidized barium oxid while the same is undergoing partial deoxidation, whereby the said oxid is maintained at a reactive temperature.

8. In the manufacture of oxygen from peroxidized barium oxid, the method of heating the said oxid, which comprises the continuous withdrawal of a portion of the oxygen evolved from said peroxidized barium oxid during the deoxidation of the same, the re-heating of the said portion of oxygen, and the continuous return to and contacting with the said oxid of the said re-heated portion, whereby the available heat of said re-heated portion of oxygen is transferred to said oxid, the volume of the portion of oxygen so withdrawn and the temperature to which it is re-heated being so regulated that the available heat imparted to the said re-heated portion of oxygen will approximately balance the loss of heat from the said oxid due to evolution of oxygen from the same.

9. The process of manufacturing oxygen, which comprises peroxidizing a metallic oxid by passing air in contact with the same at a suitable temperature and under a suitable pressure, reducing the pressure upon the peroxidized metallic oxid until the same evolves oxygen, continuously withdrawing the evolved oxygen from the said oxid, re-heating a portion of the said oxygen and returning the re-heated portion in contact with the said oxid to maintain the temperature of the same.

10. The process of manufacturing oxygen, which comprises peroxidizing a metallic oxid by passing air in contact with the same at a suitable temperature and pressure, reducing the pressure upon the peroxidized metallic oxid until the same evolves oxygen, continuously withdrawing the evolved oxygen from the oxid, re-heating a portion of the said oxygen and returning the re-heated portion in contact with the said oxid to heat the same, the volume of said re-heated portion of oxygen relative to the evolved oxygen and the temperature to which the said oxygen is re-heated being so regulated that the available heat imparted to the said re-heated oxygen will approximately balance the loss of heat from the said metallic oxid due to the evolution of the oxygen from the same.

11. The process of manufacturing oxygen, which comprises peroxidizing a metallic oxid by passing air in contact with the same at a red heat and at a pressure above that of the atmosphere, reducing the pressure upon the peroxidized metallic oxid until the same evolves oxygen, continuously withdrawing the evolved oxygen from the oxid, re-heating a portion of the said oxygen and returning the re-heated portion in contact with the said oxid to heat the same, the volume of said re-heated portion of oxygen relative to the evolved oxygen and the temperature to which the said oxygen is re-heated being so regulated that the available heat imparted to the said re-heated oxygen will approximately balance the loss of heat from the said metallic oxid due to the evolution of the oxygen from the same.

12. The process of manufacturing oxygen, which comprises peroxidizing a metallic oxid by passing air in contact with the same at a red heat and at a pressure of approximately 15 lb. per sq. in. above that of the atmosphere, reducing the pressure upon the peroxidized metallic oxid until the same evolves oxygen, continuously withdrawing the evolved oxygen from the oxid, re-heating a portion of the said oxygen and returning the re-heated portion into contact with the said oxid to heat the same while it is undergoing deoxidation, the volume of the said re-heated portion of oxygen relative to the evolved oxygen and the temperature to which the same is re-heated being so regulated that the available heat imparted to the said re-heated oxygen will approximately balance the loss of heat from the said metallic oxid during the evolution of the oxygen from the same.

13. The process of manufacturing oxygen, which comprises peroxidizing a metallic oxid by passing air in contact with the same at a temperature of approximately 1250 to 1300 degrees Fah. and a pressure of approximately 15 lb. per sq. in. above that of the atmosphere, reducing the pressure upon the peroxidized metallic oxid to at or below 2 lb. absolute, whereby the peroxid previously formed is more or less dissociated with the evolution of oxygen, withdrawing the evolved oxygen from contact with the said oxid, re-heating a portion of the said oxygen and returning the re-heated portion into contact with the said oxid to heat the same while it is undergoing deoxidation, the volume of the said re-heated portion relative to the total volume of oxygen evolved and the temperature to which the said portion is heated being so regulated that the available heat imparted to the said re-heated oxygen will approximately balance the loss of heat from the said metallic oxid while the same is undergoing deoxidation.

14. The process of manufacturing oxygen, which comprises peroxidizing barium oxid by passing air in contact with the same at a suitable temperature and pressure reducing the pressure upon the peroxidized barium oxid until the same evolves oxygen, continuously withdrawing the evolved oxygen from the said oxid, re-heating a portion of the said oxygen, and returning the re-heated portion in contact with the said oxid to maintain the temperature of the same.

15. The process of manufacturing oxygen, which comprises peroxidizing barium oxid by passing air in contact with the same at a suitable temperature and pressure, reducing the pressure upon the peroxidized barium oxid until the same evolves oxygen, continuously withdrawing the evolved oxygen from the oxid, re-heating a portion of the said oxygen and returning the re-heated portion in contact with the said oxid to heat the same, the volume of said re-heated portion of the oxygen relative to the total evolved oxygen and the temperature to which the said portion is heated being so regulated that the available heat imparted to the said re-heated oxygen will approximately balance the loss of heat from the said metallic oxid during the evolution of oxygen from the same.

16. The process of manufacturing oxygen, which comprises peroxidizing barium oxid by passing air in contact with the same at a red heat and at a pressure above that of the atmosphere, reducing the pressure upon the peroxidized barium oxid until the same evolves oxygen, continuously withdrawing the evolved oxygen from the oxid, re-heating a portion of the said oxygen and returning the re-heated portion into contact with the said barium oxid to heat the same, the volume of said re-heated portion of oxygen relative to the evolved oxygen and the temperature to which the same is re-heated being so regulated that the available heat imparted to the said re-heated oxygen will approximately balance the loss of heat from the said metallic oxid during the evolution of oxygen from the same.

17. The process of manufacturing oxygen, which comprises peroxidizing barium oxid by passing air in contact with the same at a red heat and at a pressure of approximately 15 lb. per sq. in. above that of the atmosphere, reducing the pressure upon the peroxidized barium oxid until the same evolves oxygen, continuously withdrawing the evolved oxygen from the oxid, re-heating a portion of the said oxygen and returning the re-heated portion into contact with the said oxid to heat the same while it is undergoing deoxidation, the volume of the said re-heated portion of oxygen relative to the evolved oxygen and the temperature to which the same is re-heated being so regulated that the available heat imparted to the said re-heated oxygen will approximately balance the loss of heat from the said barium oxid during the evolution of oxygen from the same.

18. The process of heating gas-evolving material to cause evolution of gas, which comprises reheating more or less of the gas evolved from said material, and passing the said reheated gas in contact with said material at a pressure below atmospheric pressure to cause evolution of gas from said material.

19. The process of heating gas-evolving material to cause evolution of gas, which comprises withdrawing a portion of the gas evolved from said material, reheating said portion of evolved gas to a temperature above the average temperature at which it is desired to maintain said material, and passing said reheated gas in contact with said material at a pressure below atmospheric pressure to heat the same.

Signed at New York city, in the county of New York and State of New York this 13th day of May, A. D. 1911.

HENRY L. DOHERTY.

Witnesses:
FRANK L. BLACKBURN,
S. B. SEVERSON.